United States Patent
Colchester et al.

[15] 3,696,113
[45] Oct. 3, 1972

[54] MANUFACTURE OF BIPYRIDYLIUM SALTS AND RELATED COMPOUNDS

[72] Inventors: John Edward Colchester; John Francis Cairns; John Gerard Carey, all of Runcorn, England

[73] Assignee: Imperial Chemical Industries Limited, Millbank, London, England

[22] Filed: July 28, 1970

[21] Appl. No.: 59,030

Related U.S. Application Data

[63] Continuation-in-part of Ser. No. 811,617, March 28, 1969, abandoned.

[52] U.S. Cl. .......................260/295 AM, 260/296 D
[51] Int. Cl. .........................C07d 31/42, C07d 31/44
[58] Field of Search...................260/295 AM, 296 D

[56] References Cited

UNITED STATES PATENTS

3,405,135  10/1968  Colchester et al.....260/296 D

*Primary Examiner*—ALan L. Rotman
*Attorney*—Cushman, Darby & Cushman

[57] ABSTRACT

There is provided a method of converting disubstituted tetrahydrobipyridyls to the corresponding bipyridinium salt by treating the tetrahydrobipyridyl with a dehydrogenating agent such as platinum metals and oxides to convert the tetrahydrobipyridyl to the corresponding dihydrobipyridyl and subsequently oxidizing the dihydrobipyridyl to the corresponding salt.

18 Claims, No Drawings

MANUFACTURE OF BIPYRIDYLIUM SALTS AND RELATED COMPOUNDS

This application is a continuation-in-part of Application Ser. No. 811,617 filed 28 Mar. 1969 now abandoned.

This invention relates to the manufacture of bipyridylium salts by converting 1,1'-disubstituted-1,1',4,4'-tetrahydro-4,4'-bipyridyls to 1,1'-disubstituted-1,1'-dihydro-4,4'-bipyridyls which can be oxidized to the corresponding quaternary bipyridylium salts which are useful herbicides.

According to the invention we provide a method of converting a 1,1'-dialkyl or dicarbamidoalkyl-1,1',4,4'-tetrahydro-4,4'-bipyridyl to the corresponding 1,1'-disubstituted-4,4'-bipyridylium salt which comprises treating the tetrahydrobipyridyl in an inert solvent at a temperature of from −50° C to 200° C with a dehydrogenating agent which is a platinum metal, a platinum metal oxide or Raney nickel to convert the tetrahydrobipyridyl to the corresponding 1,1'-disubstituted-1,1'-dihydro-4,4'-bipyridyl and subsequently oxidizing the dihydrobipyridyl to the corresponding 1,1'-disubstituted-4,4'-bipyridylium salt by means of an oxidizing agent which is oxygen or air or a compound having a redox potential in water more positive than −0.50 volts as compared with the saturated calomel electrode.

As dehydrogenating agent there may be employed any one or more of the platinum metals and their oxides and Raney nickel. The platinum metals are platinum itself, ruthenium, iridium, osmium, palladium and rhodium. The dehydrogenating agent may be in finely divided form and unsupported but it will usually be supported on a carrier, for example carbon (charcoal), alumina, silica, silica/alumina and alkaline earth carbonates and sulphates, in order to present a large surface area for contact with the tetrahydrobipyridyl.

The tetrahydrobipyridyls which may be used are 1,1'-disubstituted-1,1'4,4'-tetrahydro-4,4'-bipyridyls wherein each of the N-substituents is a lower alkyl group or a carbamido-lower alkyl group of the formula $-R_1-CONR_2R_3$ wherein $R_1$ is a lower alkyl group and $R_2$ each represents a lower alkyl group or wwherein $NR_2R_3$ represents an optionally substituted piperidino or morpholino group. The lower alkyl groups may contain up to six and especially up to four carbon atoms, and an example of a substituted morpholino group which may be present is the 2,6-dimethyl morpholino group. The tetrahydrobipyridyls may carry inert substituents, for example alkyl groups, on the carbon atoms of the pyridine nuclei.

The reaction is carried out in an inert solvent and it is convenient to employ a solution of the tetrahydrobipyridyl in the inert solvent. The tetrahydrobipyridyls are usually prepared under conditions such that they are obtained in the form of a solution in an inert solvent and they may conveniently be used in the present invention without isolation from the reaction mixture in which they have been prepared. A wide variety of inert solvents, preferably organic solvents, and preferably water-immiscible organic solvents may be employed, for example diethyl ether, tetrahydrofuran, 1,2-dimethoxyethane, bis-(2-methoxyethyl) ether and 1,4-dioxane; ketones, for example acetone; hydrocarbons, for example benzene and hexane; organic bases, for example pyridine; halogenated hydrocarbons, for example chlorobenzene, chloroform and methylene dichloride; amides, particularly tertiary alkyl-amides, for example dimethyl formamide; sulphoxides, for example dimethyl sulphoxide; nitriles, for example acetonitrile; nitro-compounds, for example nitrobenzenes; and unsaturated hydrocarbon compounds, for example olefines. Mixtures of solvents may be used, if desired. Water-immiscible solvents are preferred since these facilitate isolation of the final products.

The treatment can be carried out simply by adding the tetrahydrobipyridyl in solution in an organic solvent to the dehydrogenating agent contained in a suitable reaction vessel. The tetrahydrobipyridyls are decomposed if contacted with air or oxygen and consequently the dehydrogenating agent and the reaction vessel are advantageously purged with an inert gas, for example nitrogen, prior to addition of the tetrahydrobipyridyl. The temperature at which the treatment is carried out may vary within wide limits, for example from −50° C to 200° C, preferably from 0° C to 180° C, and especially about 30° C to 100° C. If a temperature greater than ambient is to be employed, the dehydrogenating agent is advantageously preheated to the desired temperature. This may be achieved by means of external heating of the reaction vessel and/or the use of hot inert gas to purge the vessel. If desired, the reaction vessel may be lagged. The time for which the tetrahydrobipyridyl is maintained in contact with the dehydrogenating agent can be determined by simple experiment, but will usually be of the order of from 3 hours to 24 hours.

The 1,1'-disubstituted-dihydro-4,4'-bipyridyls can be converted by oxidation into the corresponding quaternary bipyridylium salts which are well-known herbicides. Oxidation can be by means of air or oxygen, for example under acidic or neutral conditions, or any oxidizing agent can be used which has a redox potential in water more positive than −0.50 volt as compared with the saturated calomel electrode. Examples of inorganic oxidizing agents which may be used are iodine, silver nitrate, ceric sulphate, metal halides, the inorganic oxyacid anhydrides especially sulphur dioxide, and air in conjunction with water, carbon dioxide and/or acetic acid. Organic oxidizing agents for example quinones, such as benzoquinone, choranil and anthraquinone may also be used. A wide variety of oxidizing agents may be employed, their common characteristic being a redox potential in water more positive than −0.50 volts as compared with the saturated calomel electrode. Since the dihydrobipyridyls are readily oxidized by air they are usually prepared under an inert atmosphere, for example an atmosphere of nitrogen.

The product of oxidation of the 1,1'-disubstituted dihydrobipyridyl is the corresponding 1,1'-disubstituted-4,4'-bipyridylium cation and it may in some cases be necessary to add anions to the reaction mixture to obtain the 1,1'-disubstituted-4,4'-bipyridylium salt. Thus for example if air or oxygen is employed as oxidizing agent the resulting mixture will not contain an anionic species which will have to be added for example by adding an acid. Any acid may be employed for this purpose whether organic or inorganic since its function is simply the provision of anions for association with the bipyridylium cations.

However, the oxidizing agent may itself provide the anionic species of the bipyridylium salt and in this case it is not necessary to add an acid. Thus for instance use as oxidizing agent of an inorganic oxyacid anhydride will result in a bipyridylium salt directly without adding an acid. For example carbon dioxide results in the formation of the bipyridylium bicarbonate and sulphur dioxide results in the formation of the bipyridylium bisulphate. Similarly use of a metal salt may result in the bipyridylium salt directly; for example use of a metal chloride will result in formation of the bipyridylium dichloride. Use of iodine will result in formation of the bipyridylium diodide.

The oxidation may conveniently be carried out in the presence of a solvent for the dihydrobipyridyl, conveniently the solvent in which the dihydrobipyridyl is prepared.

The concentration of the dihydrobipyridyl may be conveniently from 0.05 to 0.15 mole per liter and the concentration of the oxidizing agent may be from 0.1 to 10 gms per 100 ml of the reaction mixture. If the reagents are used in high concentration care should be taken that the reaction does not become too vigorous and lead to some destruction of the desired product or to the production of unwanted by-products.

The temperature at which the oxidation is carried out will depend upon the concentration of the reagents and on the particular reagents and solvent used. We have found that suitable temperatures are from −50° C to 200° C, preferably from 0° C to 150° C; room temperature can be used. The most suitable time of reaction can be found by simple experiment and depends upon the reagents used and the temperature at which the reaction is carried out; we have however found that a minimum time of 20 to 30 minutes is generally necessary in order to obtain optimum yields. At temperatures below ambient temperatures long periods, for example 2 days, may be required in order to obtain optimum yields.

The 1,1'- (or N,N'-) disubstituted bipyridylium salt may be recovered from the reaction mixture by conventional processes for example by extraction of the reaction mixture with water or with a dilute aqueous solution of an acid for example sulphuric, hydrochloric, phosphoric or acetic acid. If the reaction mixture does not contain a water-immiscible solvent, then solvent extraction may precede the extraction with water. The 1,1'-bipyridylium salt may then be recovered from the aqueous phase after separation thereof from the organic phase, by evaporation of the water and crystallization of the salt. The dehydrogenating agent can be separated by filtration and may be re-used.

The invention is illustrated but in no way limited by the following Examples:

EXAMPLE 1

A solution of 1,1'-dimethyl-1,1',4,4'-tetrahydro-4,4'-bipyridyl (0.03 mole — prepared from methyl pyridinium chloride) in benzene (50 ml) was added with stirring to a suspension of 0.3 gm of a catalyst consisting of finely divided platinum metal supported on carbon (5 percent w/w platinum) in benzene (50 ml) under an atmosphere of nitrogen. The mixture was heated at 70° C to 75° C for 4 hours, after which time it was found to contain 1,1'-dimethyl-1,1'-dihydro-4,4'-bipyridyl. Air was blown through the mixture. N/10 hydrochloric acid was then added and the mixture was filtered to remove the catalyst residue. The resulting aqueous layer was separated. Colorimetric analysis of this layer indicated that 1,1'-dimethyl-4,4'-bipyridylium dichloride was obtained. The reaction efficiency was 7 percent based on the methyl pyridinium chloride starting material.

EXAMPLE 2

The procedure of Example 1 was repeated except that a suspension of 1.0 gm of a catalyst consisting of finely divided palladium supported on carbon (3 percent w/w palladium) was employed instead of the platinum-on-carbon catalyst and heating at 70° C to 7° C was for 9 hours instead of 4 hours. The reaction efficiency was 11.7 percent based on the methyl pyridinium chloride starting material.

EXAMPLE 3

The procedure of Example 1 was repeated but using 0.5 gm of a catalyst consisting of finely divided rhodium supported on carbon (5 percent w.w rhodium) instead of the platinum-on-carbon catalyst and heating at 70° C to 75° C was for 4½ hours instead of 4 hours. The reaction efficiency was 10 percent based on the methyl pyridinium chloride starting material.

EXAMPLE 4

The procedure of Example 1 was repeated using a suspension of Raney nickel in benzene (50 ml), prepared from 12 gm of Raney nickel alloy, instead of the suspension of platinum-on-carbon catalyst.

The reaction efficiency was 25 percent based on the methyl pyridinium chloride starting material.

EXAMPLE 5

A solution of ceric sulphate (7 gms) in 1 N sulphuric acid (125 mls) was added with stirring at 25° C to a solution of 1,1'-dimethyl-1,1'-dihydro-4,4'-bipyridyl (0.02 mole) in toluene (50 mls) under an atmosphere of nitrogen.

The aqueous phase was separated from the resulting mixture and was found by spectrophotometric analysis to contain the 1,1'-dimethyl-4,4'-bipyridylium cation in an amount representing a reaction efficiency of about 100 percent with respect to the dihydrobipyridyl fed.

EXAMPLE 6

A solution of 1,1'-dimethyl-1,1'-dihydro-44'-bipyridyl (0.02 mole) in toluene (50 mls) was added under an atmosphere of nitrogen to a stirred solution of sulphur dioxide gas (0.04 mole) in acetonitrile (50 mls). A precipitate was obtained and this was dissolved in water to yield a solution which was found by spectrophotometric analysis to contain the 1,1'-dimethyl-4,4'-bipyridylium cation. The reaction efficiency in respect of this cation was about 100 percent based on the dihydrobipyridyl fed.

EXAMPLE 7

Dilute (5 percent) aqueous acetic acid solution (50 mls) was added to a solution of 1,1'-dimethyl-1,1'-dihydro-4,4'-bipyridyl (0.02 mole) in toluene at 25° C with stirring under an atmosphere of nitrogen. Air was then blown through the mixture at a rate of 50 liters/hour for 10 minutes. The resulting solution was found by spectrophotometric analysis to contain the 1,1'-dimethyl-4,4'-bipyridylium cation in an amount representing a reaction efficiency of 100 percent based on the dihydrobipyridyl fed.

EXAMPLE 8

A small amount of water (ca 10 mls) was added to a solution of 1,1'-dimethyl-1,1'-dihydro-4,4'-bipyridyl (0.02 mole) in toluene (50 mls) under an atmosphere of nitrogen, and a mixture of air and carbon dioxide (v/v ratio 1) was blown through the solution at a rate of 50 ml/hour for 10 minutes. The product was the 1,1'-dimethyl-4,4'-bipyridylium cation and the reaction efficiency was 100 percent based on the dihydrobipyridyl fed.

EXAMPLE 9

A solution of 2 parts by weight of benzoquinone in diglyme (50 mls) was added to a solution of 1 part by weight of 1,1'-dimethyl-1,1'-dihydro-4,4'-bipyridyl in toluene (50 mls) under an atmosphere of nitrogen. Aqueous sulphuric acid (2 N) was added to the mixture until the mixture just became acidic and the resulting aqueous layer was separated from the organic solvent layer. Spectrophotometric analysis of the aqueous phase showed the presence of 1,1'-dimethyl-4,4'-bipyridylium cation in an amount representing a reaction efficiency of 70 percent based on dihydrobipyridyl fed.

EXAMPLE 10

A solution of 2 parts by weight of chloranil in dimethyl formamide (50 mls) was added to a solution of 1 part by weight of 1,1'-dimethyl-1,1'-dihydro-4,4'-bipyridyl in toluene (50 mls) under an atmosphere of nitrogen. The resulting precipitate was filtered off and treated with aqueous sulphuric acid (2 N) until the mixture just became acidic. A precipitate comprising the reduced chloranil was removed by filtration and the resulting solution was analyzed. The reaction efficiency was 85 percent in respect of 1,1'-dimethyl-4,4'-bipyridylium cation produced, based on dihydrobipyridyl fed.

Having now particularly described the invention, what we claim is:

1. A method of converting a 1,1'-di(lower alkyl)- or 1,1'-di(carbamido lower alkyl)-1,1',4,4'-tetrahydro-4,4'-bipyridyl to the corresponding 1,1'-disubstituted-4,4'-bipyridylium salt which comprises treating the tetrahydrobipyridyl in an inert solvent at a temperature of from −50° C to 200° C with a dehydrogenating agent selected from the group consisting of a platinum metal, a platinum metal oxide and Raney nickel to convert the tetrahydrobipyridyl to the corresponding 1,1'-disubstituted-1,1'-dihydro-4,4'-bipyridyl, and subsequently oxidizing the dihydrobipyridyl to the corresponding 1,1'-disubstituted-4,4'-bipyridylium cation by means of an oxidizing agent having a redox potential in water more positive than −0.50 volts as compared with the saturated calomel electrode.

2. A method as claimed in claim 1 wherein the inert solvent is substantially immiscible with water.

3. A method as claimed in claim 1 wherein the temperature is from 0° C to 180° C.

4. A method as claimed in claim 3 wherein the temperature is from 30° C to 100° C.

5. A method as claimed in claim 1 wherein the reaction is carried out under an inert atmosphere.

6. A method as claimed in claim 5 wherein the inert atmosphere comprises nitrogen gas.

7. A method as claimed in claim 1 wherein the dehydrogenating agent is a platinum metal.

8. A method as claimed in claim 1 wherein the dehydrogenating agent is a platinum metal oxide.

9. A method as claimed in claim 1 wherein the dehydrogenating agent is Raney nickel.

10. A method as claimed in claim 1 wherein the dehydrogenating agent is supported on a carrier.

11. A method as claimed in claim 10 wherein the carrier is carbon.

12. A method as claimed in claim 10 wherein the carrier is an alkaline earth metal salt.

13. A method as claimed in claim 12 wherein the salt is an alkaline earth metal oxide.

14. A method as claimed in claim 1 wherein the oxidizing agent is a metal salt.

15. A method as claimed in claim 1 wherein the oxidizing agent is an inorganic oxyacid anhydride.

16. A method as claimed in claim 1 wherein the oxidizing agent is a quinone.

17. A method as claimed in claim 1 wherein the 1,1'-substituents of the tetrahydrobipyridyl are methyl groups.

18. A method as claimed in claim 1 wherein the 1,1'-substituents of the tetrahydrobipyridyl are carbamidomethyl groups.

* * * * *

UNITED STATES PATENT OFFICE
CERTIFICATE OF CORRECTION

Patent No. 3,696,113   Dated October 3, 1972

Inventor(s) John Edward Colchester; John Francis Cairns; John Gerard Carey

It is certified that error appears in the above-identified patent and that said Letters Patent are hereby corrected as shown below:

In the heading, after "Filed: July 28, 1970 Appl. No.: 59,030" insert --Claims priority, application Great Britain, Apr. 16, 1968, 17893/68--.

Signed and sealed this 3rd day of July 1973.

(SEAL)
Attest:

EDWARD M. FLETCHER, JR.  
Attesting Officer

Rene Tegtmeyer  
Acting Commissioner of Patents